US012682481B2

(12) United States Patent
Öhrn et al.

(10) Patent No.: US 12,682,481 B2
(45) Date of Patent: Jul. 14, 2026

(54) METHODS AND DEVICES FOR SETTING A THRESHOLD IN AN OBJECT DETECTION SYSTEM

(71) Applicant: Axis AB, Lund (SE)

(72) Inventors: Anton Öhrn, Lund (SE); Johan Sternby, Lund (SE); Amanda Nilsson, Lund (SE)

(73) Assignee: Axis AB, Lund (SE)

( * ) Notice: Subject to any disclaimer, the term of this patent is extended or adjusted under 35 U.S.C. 154(b) by 348 days.

(21) Appl. No.: 18/533,904

(22) Filed: Dec. 8, 2023

(65) Prior Publication Data

US 2024/0212196 A1 Jun. 27, 2024

(30) Foreign Application Priority Data

Dec. 22, 2022 (EP) ..................................... 22216041

(51) Int. Cl.
*G06T 7/70* (2017.01)
*G06V 10/25* (2022.01)
*G06V 10/764* (2022.01)

(52) U.S. Cl.
CPC ................ *G06T 7/70* (2017.01); *G06V 10/25* (2022.01); *G06V 10/764* (2022.01); *G06V 2201/07* (2022.01)

(58) Field of Classification Search
CPC ........ G06T 7/70; G06V 10/25; G06V 10/764; G06V 2201/07; G06V 10/62; G06V 20/10; G06V 20/52

USPC .......................................................... 382/103
See application file for complete search history.

(56) References Cited

U.S. PATENT DOCUMENTS

| | | | |
|---|---|---|---|
| 11,308,717 B2 | 4/2022 | Hashimoto et al. | |
| 2015/0139551 A1 | 5/2015 | Lin et al. | |
| 2016/0140414 A1 | 5/2016 | Pham | |
| 2019/0130230 A1 | 5/2019 | Kang et al. | |
| 2019/0258878 A1* | 8/2019 | Koivisto ................. | G01S 7/417 |
| 2021/0150218 A1* | 5/2021 | Chen ...................... | G06V 10/25 |
| 2021/0209369 A1 | 7/2021 | Timor et al. | |
| 2022/0262031 A1* | 8/2022 | Yamasaki ................. | G06T 7/70 |

FOREIGN PATENT DOCUMENTS

| | | |
|---|---|---|
| CN | 109596623 A | 4/2019 |
| EP | 3819864 A1 | 5/2021 |
| JP | 2013-092955 A | 5/2013 |
| KR | 20220123866 A | 9/2022 |

OTHER PUBLICATIONS

Novelty Search UppdragsHuset (2023).
Sun, J., et al., "You Don't Only Look Once: Constructing Spatial-Temporal Memory for Integrated 3D Object Detection and Tracking," IEEE/CVF International Conference on Computer Vision (ICCV), Montreal, QC, Canada, (2021).

(Continued)

*Primary Examiner* — Neil R Mclean
(74) *Attorney, Agent, or Firm* — Volpe Koenig

(57) ABSTRACT

A method, a device and a non-transitory computer-readable storage medium for setting a confidence threshold for objects detected in a region of a captured scene based on historical confidence scores for objects detected in that region.

14 Claims, 3 Drawing Sheets

(56)              References Cited

OTHER PUBLICATIONS

Extended European Search Report issued on May 23, 2023 for European Patent Application No. 22216041.8.
Redmon, J., et al., "You Only Look Once: Unified, Real-Time Object Detection," Conference: 2016 IEEE Conference on Computer Vision and Pattern Recognition (CVPR), (2016).
Liu et al., "SSD: Single Shot MultiBox Detector," 9905. 21-37. (2016).

* cited by examiner

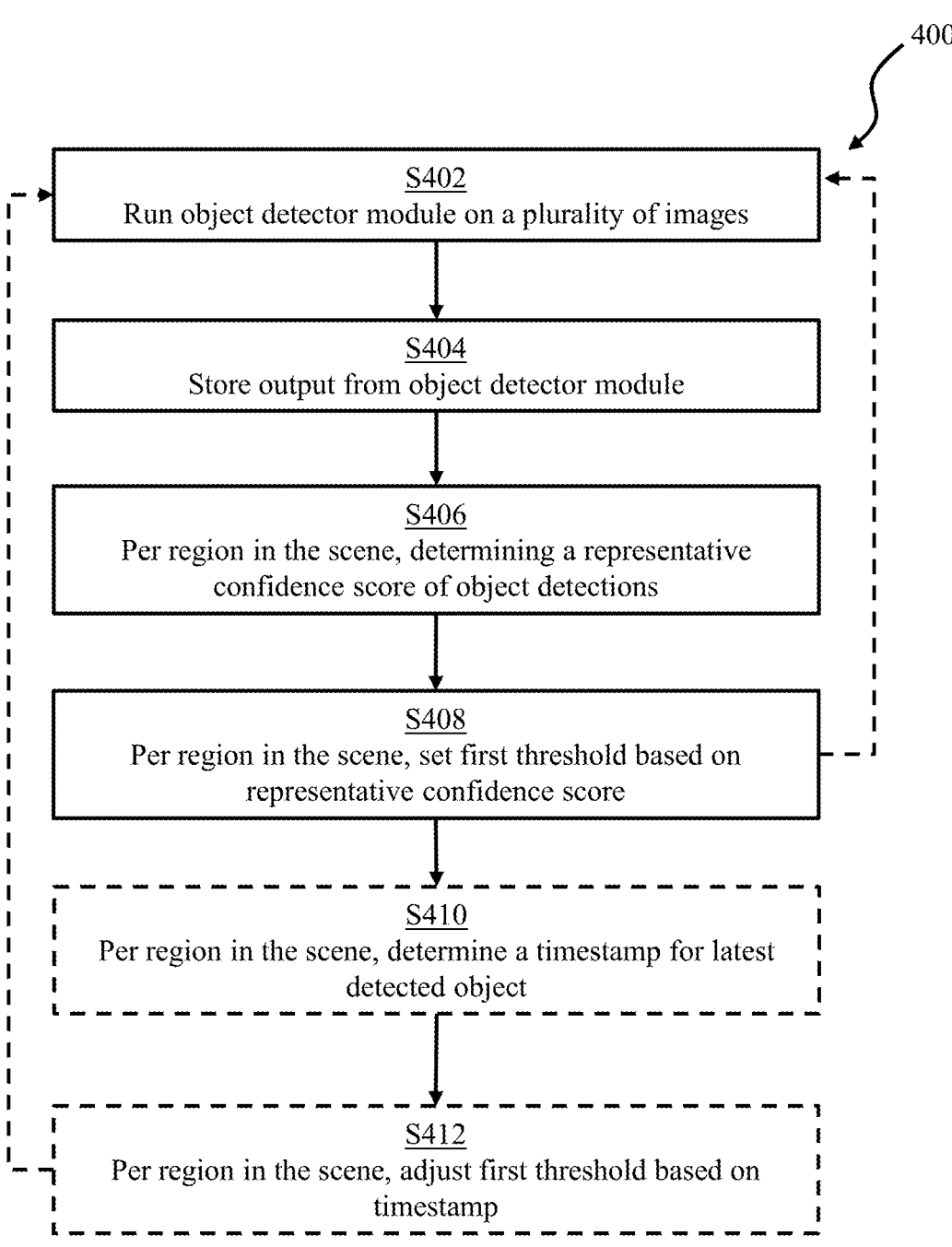

400

S402
Run object detector module on a plurality of images

S404
Store output from object detector module

S406
Per region in the scene, determining a representative confidence score of object detections S408
Per region in the scene, set first threshold based on representative confidence score S410
Per region in the scene, determine a timestamp for latest detected object S412
Per region in the scene, adjust first threshold based on timestamp

Fig. 4

METHODS AND DEVICES FOR SETTING A THRESHOLD IN AN OBJECT DETECTION SYSTEM

FIELD OF INVENTION

The present disclosure relates to the field of object detection. In particular, it relates to a method, a device and a non-transitory computer-readable storage medium for setting a confidence threshold for objects detected in a region of a captured scene based on historical confidence scores for objects detected in that region.

TECHNICAL BACKGROUND

Systems for object detection have many applications within the field of camera monitoring. Example applications include object tracking, privacy masking, detection of suspicious activities, alarm systems, etc. In order to determine if a detected object is relevant for the application in which the object detection system is implemented, a detected object may be classified as one or more object classes. Each of the classes may be associated with a confidence score, and the object detection system may compare the confidence scores of the object classes to determine which of the classes that is the most likely classification of the detected object. Moreover, to filter out uncertain classifications (reduce false positives), the object detection system may compare the confidence scores of the object classes with a threshold confidence score, representing the minimum confidence of an object classification required for the object detection system to output the determined object class of the detected object to an upstream application (such as an object tracking, privacy masking, detection of suspicious activities, alarm systems, etc.).

However, it may be difficult to determine one such minimum confidence score that apply to all object classes and all regions of a captured scene without risking getting false positives or false negatives for certain object classes and/or certain regions of the captured scene.

There is thus a need for improvements within this context.

SUMMARY

In view of the above, it is thus an object of the present disclosure to overcome or at least mitigate the problems discussed above. Especially, it is an object to provide methods, devices and non-transitory computer-readable storage mediums which adaptively set confidence thresholds in an object detection system to reduce false positives and/or false negatives.

According to a first aspect of the present disclosure, there is provided a method for setting a threshold in an object detection system, the object detection system comprising: an object detector module configured to detect objects in an image and to output one or more object detections of objects classified as a first object class, each object detection being associated with an object location and a confidence score, and an object detection filtering module configured to operate on the output of the object detector module to remove any object detection of the one or more object detections being associated with a confidence score below a first threshold. The method comprises the steps of:

a) running the object detector module on a plurality of images depicting a scene and storing outputs from the object detector module;

b) for each region of a plurality of regions in the scene: based on the stored outputs, determining a representative confidence score of object detections being associated with an object location within said region;

c) setting the first threshold for object detections associated with an object location within a first region of the plurality of regions based on the representative confidence score determined for the first region, wherein the first threshold is set to have a lower value if a higher representative confidence score has been determined for the first region compared to if a lower representative confidence score has been determined for the first region.

The inventors have realized that by gathering statistics from historical object detections over time in a scene and use this data to define the first threshold, the object detection system may be more or less strict towards the detections of a certain class in specific regions of the scene based on which objects that usually appear in the scene and how these objects typically behave in the scene.

For example, in case cars typically appear with high certainty (high confidence scores) in one part of the scene (e.g., on a highway), the first threshold may be lowered such that object detections classified as cars with a lower certainty (lower confidence scores) in this part of the scene are not removed in the object detection filtering module. As an example, in case the lighting conditions quickly changes such that certainty scores associated with object detections classed as cars are generally lowered (due to e.g., less details in the images capturing the scene), the present embodiment may still allow for these object detections to clear the cut in the object detection filtering module. Consequently, false negatives may be reduced. In another examples, object detections relating to cars on the highway being partly occluded in the images (leading to lower confidence scores) may also not be removed in object detection filtering module. Consequently, false negatives may be reduced.

In another example, people very seldom appear walking on the highway. Consequently, object detections classified as "people" in the region of the scene corresponding to the highway are rare and often associated with a low confidence score (noise or misclassifications). Using the techniques described herein may result in that an object detection classified as a person need to be associated with a higher certainty score (compare to object detections classified as cars) in order not to be filtered out (removed) by the object detection filtering module. Consequently, false positives may be reduced.

As used herein, "confidence score" of a classification of an object detection relates to the probability of the object detection being classified correctly according to the object detector module. A lower confidence score means that it is less certain that the classification of the object detection being correct (according to the object detection system) compared to a higher confidence score. The confidence score may for example range from 0.0-1.0 where 1.0 represents the highest possible probability for a correct classification. Any other scale is possible, such as 0-100, 0-5, etc.)

As used herein, "object location" may be any type of localization data for the object detection in the scene. For example, it may be represented by a single coordinate, or a bounding box.

As used herein, "region of the scene" may correspond to a same pixel coordinate(s) in each of the plurality of images (in case of a fixed camera capturing the scene). In case of a moving camera, pixel coordinates in the images may be transformed based on camera movements to correspond between images. In other embodiments, a region of the scene may correspond to parts of the plurality of images having a certain semantic segmentation (e.g., road, walkway, building, grass, etc.,).

As used herein, a "representative confidence score" relates to a confidence score that represent a plurality of confidence scores for object detections of a certain object class at a certain region of the scene over the plurality of images. The algorithm for determining such representative confidence score depends on the application in which the object detection system is implemented and will be further exemplified below.

In some embodiments, object detections associated with a confidence score below a second threshold may be disregarded when determining the representative confidence score. Advantageously, noise or low certainty classifications may be removed before determining the representative confidence score.

In some embodiments, the representative confidence score is an average confidence score of object detections being associated with an object location within said region. As described above, object detections associated with a confidence score below a second threshold may be disregarded before calculating the average. Advantageously, an average measure may provide a low complexity way of calculating a representative confidence score.

In some embodiments, the object detector module is configured to associate each of the one or more object detections with a respective timestamp. The timestamp may correspond to a point in time when the image, in which an object detection originates, was captured. The timestamp may alternatively correspond to the point in time when the object detector module detected the object or outputted the object detection. Such timestamp may be used to determine a weighted average confidence score and use that as a representative confidence score. For example, confidence scores of comparably newer object detections may be weighted higher than confidence scores of older object detections, to better account for a changing pattern among the object detections. In other embodiments, the value of the confidence score may be used for weighting the confidence scores, such that higher, or lower, confidence scores are considered more important when determining the representative confidence score. Other functions for determining the representative confidence score from a plurality of confidence scores may be used, e.g., downweighing outliers, using a median confidence score, etc.

In examples, the step of setting the first threshold comprises determining a difference between the representative confidence score and a predefined threshold confidence score, wherein upon the difference being above 0, the first threshold is set to a value lower than the predefined threshold confidence score, wherein upon the difference being below 0, the first threshold is set to a value higher than the predefined threshold confidence score. The predefined threshold confidence score may be considered as a baseline for the object detection filtering module. For example, the predefined threshold confidence score may be used as the default first threshold, for example when the representative confidence score for an object class and regions of the scenes cannot be determined (e.g., due to no data to base the decision on). Moreover, by comparing the representative confidence score to such a baseline, reasonable values of the first threshold may be facilitated (i.e., centered around the predefined value).

In some examples, the value of the first threshold is set based on the size of the difference. For example, a deviation between the first threshold and the predefined threshold confidence score may be set to increase with increasing size of the difference.

To further facilitate reasonable values of the first threshold, and to reduce the risk of outliers in the stored data negatively affecting the utility of the object detection system, the value of the first threshold may be capped at a minimum value and/or a maximum value.

As mentioned above, for certain regions of the scene, it may be uncommon that an object detection of a certain object type occurs. In these cases, it may be advantageous to adjust the first threshold to be higher to reduce the risk of false object detections of that object type in these areas. Similarly, for areas where object detections of a certain object type abundantly occur, it may be advantageous to adjust the first threshold to be lower to reduce the risk of missed object detections of that object type in these areas. To achieve one or both of the above, in some embodiments, wherein the object detector module is configured to associate each of the one or more object detections with a respective timestamp as described above, the method further comprises:

d) for each region of the plurality of regions in the scene: based on the stored output, determining a latest timestamp in the stored output of an object detection being associated with an object location within said region;

e) adjusting the first threshold set in step c) for object detections associated with an object location within the first region of the plurality of regions based on the latest timestamp determined for the first region, wherein the first threshold is adjusted to have a higher value if an earlier latest time stamp has been determined for the first region, compared to if a later latest time stamp has been determined for the first region.

Consequently, the first threshold for a certain object type and a certain region of the scene may be adjusted based on when in time an object detection of that object type was latest found/existed in that region (e.g., the latest timestamp of such occurrence). The first threshold may be adjusted to increase with an increasing duration since the latest timestamp. After the adjustment, the value of the first threshold may be capped at a minimum value and a maximum value.

According to some embodiments, the method further comprising the step of: continuously receiving images at the object detector module:

wherein the steps a)-c), or a)-e) are performed at a plurality of points in time, wherein for each point in time, the object detector module is run on the latest received N>1 images. Consequently, the first threshold may be continuously updated based on changing conditions for object detection, such as changing frequency or behavior of objects in the scene, changing lighting conditions in the scene, updated algorithms in the object detector module, etc. The number (N) of images which the object detector module is run on at each of the time points may correspond to detecting objects in the scene during a time span of for example 1, 5, 10, 30, 60 etc., minutes. N also depends on the number of images per captured second that are used. In some embodiment, all images captured by a camera may be used, such as 30 or 60 FPS. In other embodiments, only a fraction of those images is used, such as, 5 per second, 1 per second or 1 per every five seconds.

In examples, step c) is performed for M>1 regions of the plurality of regions, (such that a first threshold is set for several regions in the scene). In this example, when the object detection filtering module then receives a first object detection classified as the first object type which is associated with a confidence score and with a bounding box that overlaps the M regions, the object detection filtering module needs to consider the different first thresholds that are set for each of the regions which the bounding box overlaps. Put differently, the object detection filtering module is configured to determine the first threshold to be used for the first object based on the first threshold set for each region of the M regions. Advantageously, this embodiment allows for object detections of objects having different sizes (in the scene as captured in the images) as well as any sizes of the regions of the scene, both during the phase of setting the first thresholds in the regions of the scene and during the phase of using the set first thresholds for filtering out object detections which has too low confidence score.

For example, the step of determining the first threshold to be used for said first object detection may comprise one of: calculating an average value of the first threshold set for each of the M regions and using the average value as the first threshold for the first object detection; calculating a maximum value of the first threshold set for each of the M regions and using the maximum value as the first threshold for the first object detection; calculating a minimum value of the first threshold set for each of the M regions and using the minimum value as the first threshold for the first object detection. Any other suitable way of calculating the threshold to be used when an object detection is associated with a bounding box that overlaps several regions in the scene may be used, such as using the median threshold.

According to a second aspect of the disclosure, the above object is achieved by an object detection system comprising: an object detector module configured to detect objects in an image and to output one or more object detections of objects classified as a first object class, each object detection being associated with an object location and a confidence score; an object detection filtering module configured to operate on the output of the object detector module to remove any object detection of the one or more object detections being associated with a confidence score below a first threshold; and a threshold determining module configured to: run the object detector module on a plurality of images depicting a scene and store outputs from the object detector module; for each region of a plurality of regions in the scene: based on the stored outputs, determine a representative confidence score of object detections being associated with an object location within said region. The threshold determining module then set the first threshold for object detections associated with an object location within a first region of the plurality of regions based on the representative confidence score determined for the first region, wherein the first threshold is set to have a lower value if a higher representative confidence score has been determined for the first region compared to if a lower representative confidence score has been determined for the first region.

In some examples, the object detection system of the second aspect is being implemented in a monitoring camera. In other examples, the object detection system is separate from the camera but remotely connected to the camera for capturing images of a scene.

According to a third aspect of the disclosure, the above object is achieved by a non-transitory computer-readable storage medium having stored thereon instructions for implementing the method according to the first aspect when executed on a device having processing capabilities.

The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features, and advantages of the present disclosure, will be better understood through the following illustrative and non-limiting detailed description of embodiments of the present disclosure, with reference to the appended drawings, where the same reference numerals will be used for similar elements, wherein:

FIG. 4 shows a flow chart of setting a threshold in an object detection system according to embodiments.

DETAILED DESCRIPTION

Figure 1:
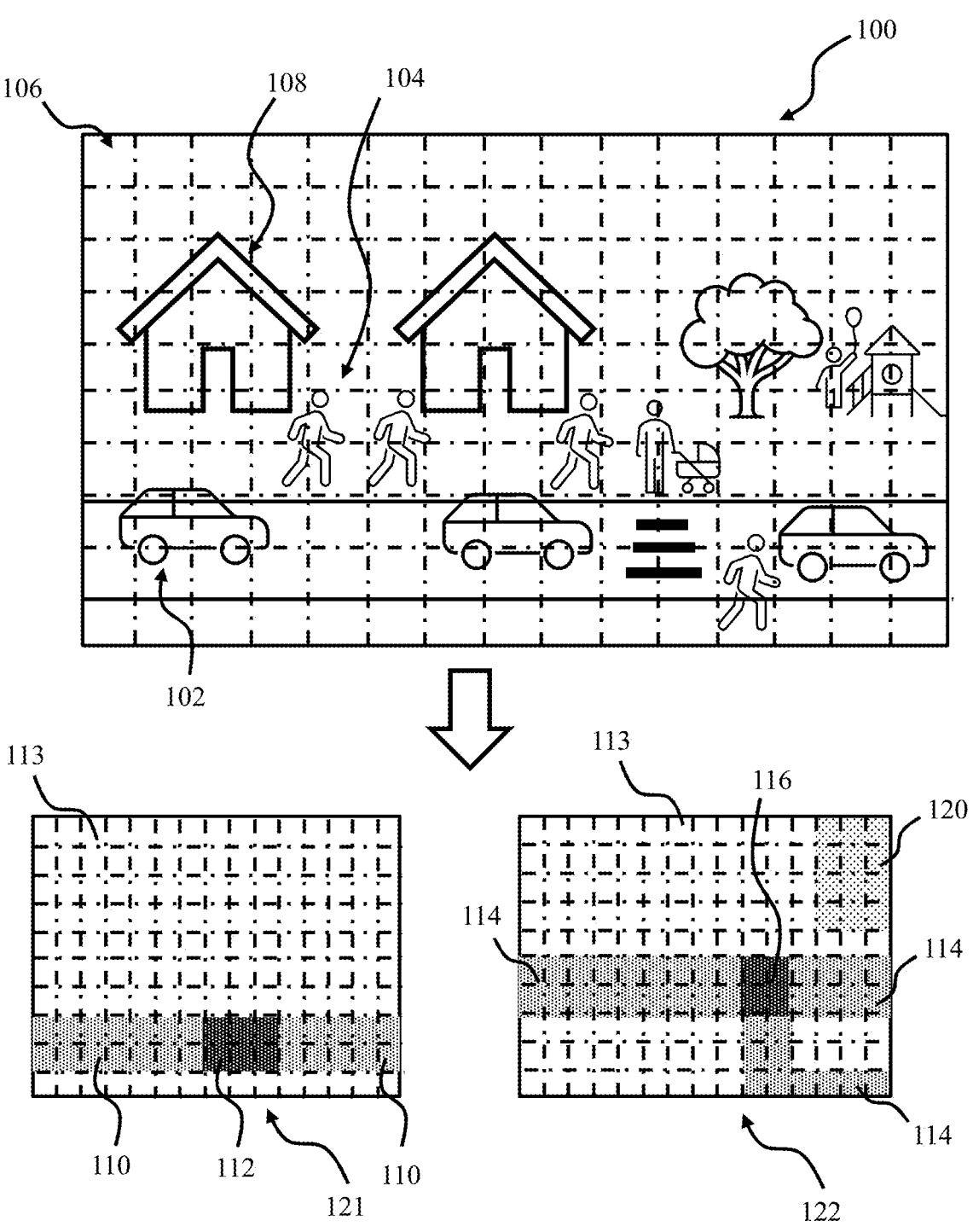
FIG. 1 shows an example of setting first thresholds in a plurality of regions of a scene for two different object classes detected in a scene.

The present disclosure will now be described more fully hereinafter with reference to the accompanying drawings, in which embodiments of the disclosure are shown. The systems, devices and modules disclosed herein will be described during operation.

The present disclosure relates to the field of object detection. Object detection is a technology that detects instances of objects of a certain class (such as humans, buildings, or cars) in digital images and videos capturing a scene comprising these classes of real objects. Methods for object detection generally use neural network-based or non-neural approaches. For non-neural approaches, it becomes necessary to first define features using for example edge detection, scale invariant feature transforms, Haar features, etc., then using a technique such as support vector machine (SVM) to do the classification. Neural network-based techniques are able to do end-to-end object detection without specifically defining features but instead by inputting pixels from an image into for example a convolutional neural network (CNN). There are many possible techniques for object detection, such as YOLO: Redmon et al. (2016). You Only Look Once: Unified, Real-Time Object Detection. arxiv.org. https://arxiv.org/pdf/1506.02640v5.pdf or SSD: Liu et al. (2016). SSD: Single Shot MultiBox Detector. arxiv.org. https://arxiv.org/pdf/1512.02325.pdf.

Each object found in the image may be classified into one or more object classes. For example, a detected object may be classified into a plurality of object classes, where one of the classes have the highest confidence score and thus is the most likely object class for the detected object.

Camera monitoring systems typically comprise an object detection system to detect objects in an image or video. The object detection system classifies the detected objects and output any detected object classified in object classes that are interesting for the application of the monitoring system, for example an object that has been classified with a confidence score that meet the requirements for that application. For example, object detection systems may be used for purposes such as object tracking, privacy masking, detection of suspicious activities, proximity alarms, etc. To reduce false alarms, the confidence score of an object detection may be compared to a threshold confidence before outputted by the object detection system, to filter out (remove) any object detections where the classification is uncertain (according to the requirements of the application).

However, setting a too high threshold confidence may instead increase the risk of false negatives, which means that object detections that would be interesting for the application are removed. Moreover, it may be difficult to set a consistent threshold for all object classes and all areas of a monitored scene since object behaviour typically changes based on object class and on location in the scene. The present disclosure aims to provide techniques to adapt the confidence threshold to improve an object detection system.

Figures 2, 3:
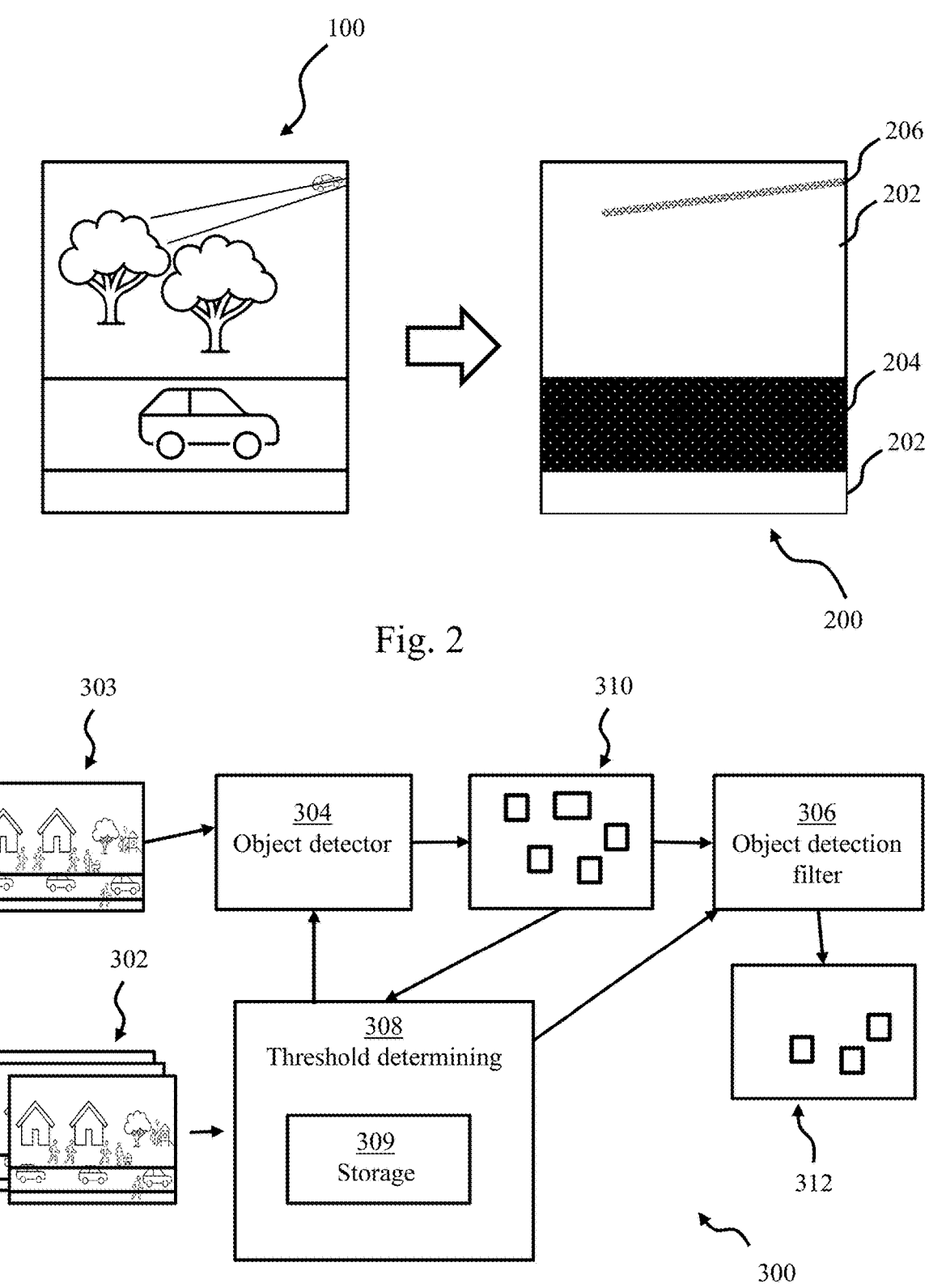
FIG. 2 shows an example of adjusting first thresholds in a plurality of regions of a scene for an object class detected in a scene.
FIG. 3 shows an object detection system according to embodiments.

FIG. 3 shows an object detection system 300. The object detection system 300 may in examples be implemented in a single device such as a camera. In other examples, some or all of different components (modules, units, etc.,) 304, 306, 308 may be implemented in a server or in the cloud. Generally, the device (camera, server, etc.,) implementing the components 304, 306, 308 may comprise circuitry which is configured to implement the components 304, 306, 308 and, more specifically, their functionality. The described features in the object detection system 300 can be implemented advantageously in one or more computer programs that are executable on a programmable system including at least one programmable processor coupled to receive data and instructions from, and to transmit data and instructions to, a data storage system, at least one input device such as a camera, and at least one output device such as a display. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits).

In FIG. 3, for ease of description, the object detection system 300 is described as only detecting objects of a first object class. However, an object detection system 300 may be configured to detect objects of a plurality of object classes, for example 2, 5, 7, 10, 12, etc. In those cases, the object detection system may be configured to set location-based confidence thresholds for each of the plurality of classes as described herein.

The object detection system 300 comprises an object detector module 304 configured to detect objects in an image 302, 303. The object detector module 304 is configured to output one or more object detections 310 of objects classified as the first object class, wherein each object detection being associated with an object location (such as a center point, bounding box, etc.,) and a confidence score. As schematically shown in FIG. 3 in reference 310, each object location may comprise a bounding box of the detected object in the input image 302, 303.

The object detection system 300 further comprises an object detection filtering module 306 configured to operate on the output 310 of the object detector module 304.

The object detection filtering module 306 is configured to remove any object detection of the one or more object detections in the output 310 being associated with a confidence score below a first threshold (the confidence threshold). The object detection filtering module 306 may then output the remaining object detections 312 for further processing according to the application in which the object detection system is implemented.

To provide location-based thresholding as described herein, the object detection system 300 further comprises a threshold determining module 308 that is configured to run the object detector module on a plurality of images 302 depicting a scene and store outputs 310 from the object detector module 304, for example in storage 309. It should be noted that storage 309 may be provided locally or externally at an external component and accessible by the threshold determining module 308. The plurality of images 302 may be historically captured images, for example representing the scene during a time interval of 5 minutes, which in some cases does not include a real-time captured image 302.

The threshold determining module 308 is further configured to, based on the stored output and for each region of a plurality of regions in the scene, determine a representative confidence score of object detections being associated with an object location within said region. As will be described further below, a region may correspond to a pixel coordinate in the input images 302, an area in the images (e.g., at least implicitly defined by a top-left, top-right, bottom-left and bottom-right pixel coordinate), or a region of the scene according to a semantic segmenting algorithm run on the input images 302. An object detection may be associated with an object location within a region if it has a partial or complete spatial overlap with the region, such as if the bounding box of the object detection partly or completely overlaps with the region. Accordingly, the threshold determining module 308 may, for a region, be configured to determine a representative confidence score of all object detections which has a partial or complete spatial overlap with the region.

The representative confidence score may be calculated using different approaches, e.g., based on the requirements of the application in which the object detection system 300 is implemented. In some embodiments, only the object detections for which the first object class was the most probable classification are considered. In other embodiments, object detection for which the first object class was one of the top X (2, 3, etc.) probable classifications are considered. In some embodiments, any object detections associated with a confidence score below a second threshold may be disregarded when determining the representative confidence score. The second threshold may be implemented to filter out object detections that are likely to be noise, such as those associated with a confidence score of less than 0.1, 0.2, 0.3, etc. (on a scale to 1.0).

After the final set of relevant object detections for a region of the scene in the stored output have been determined by the threshold determining module 308, a representative confidence score of relevant object detections may be determined for that region. The threshold determining module 308 may implement any suitable algorithm for determining the representative confidence score. For example, the representative confidence score may be an average confidence score of the relevant object detections associated with an object location in that region. In other examples, the representative confidence score is a weighted average confidence score of the relevant object detections associated with an object location in that region. The weighting may be based on a value of the confidence score. Depending on the application of the object detection system 300, a comparably higher confidence score may result in a comparably larger weight, or a comparably lower confidence score may result in a comparably larger weight. In some embodiments, the age of the object detection may also be weighted in. For example, an object detection originating from an earlier captured image among the plurality of images 302 may be downweighed compared to an object detection originating from a later captured image among the plurality of images 302. Accordingly, the object detector module 304 may be configured to associate each of the one or more object detections with a respective timestamp. The timestamp may be based on a timestamp of capturing the image among the plurality of images 302 in which the object detection originates.

In some embodiments, for regions of the scene where none, or few (e.g., less than a threshold number) object detections have been made, the threshold determining module 308 may be configured to set a predetermined representative confidence score, such as for example 0.5. In other embodiments, the threshold determining module 308 may mark such region as not applicable or otherwise indicate that such region has not been evaluated.

After determining the representative confidence score for each region in the captured scene, the threshold determining module 308 is configured to, for at least a first region among the plurality of regions, set the first threshold to be used by the object detection filtering module 308. In some embodiments, the first threshold is set for each region where a representative confidence score is determined. In some embodiments, for any regions of the scene where none, or few (e.g., less than a threshold number) object detections have been made, the threshold determining module does not set a first threshold. Instead, an already defined threshold at the object detection filtering module 306 may be used.

The threshold determining module 308 is configured to set the first threshold such that the first threshold have a lower value if a higher representative confidence score has been determined for a certain region compared to if a lower representative confidence score has been determined for the same region. In other words, for regions where object detections of the first object class have been made with a higher certainty/probability the first threshold is lower compared to regions where object detections of the first object class have been made with a lower certainty/probability (which thus get a higher first threshold). In this way, the risk of false positives and false negatives for this region is balanced based on object behavior in this region.

In some embodiments, the threshold determining module 308 may be configured to determine a difference between the representative confidence score and a predefined threshold confidence score to determine the first threshold. Upon the difference being above 0 (i.e., the representative confidence score is higher than the predefined threshold confidence score) the first threshold is set to a value lower than the predefined threshold confidence score. Upon the difference being below 0 (i.e., the representative confidence score is lower than the predefined threshold confidence score), the first threshold is set to a value higher than the predefined threshold confidence score. The predefined threshold confidence score may be for example 0.5 (on a scale from 0-1.0 where 1.0 represents the highest possible probability for a correct classification). The value of the first threshold may be set based on the size of the difference. This could be a linear correspondence, or according to a function such as a sigmoid function or any other function which empirically is found to give a good result. The value of the first threshold may be capped at a minimum value and/or a maximum value to reduce the risk of an unsuitable threshold. The minimum value may for example be 0.1, 0.2, 0.25, 0.3, etc., and the maximum value may for example be 0.7, 0.8, 0.85, 0.9, etc. (on a scale from 0-1.0). Such a cap may be based on the application and may be done at the object detection filtering module 306 to allow for a generic implementation of the threshold determining module 308.

As will be further described below in conjunction with FIG. 2, the object detection filtering module 308 further adjust the first threshold according to when in time (e.g., according to the time of capturing the relevant image among the plurality of images 302) an object detection for a certain region were last made. In this embodiment the object detector module 304 is configured to associate each of the one or more object detections with a respective timestamp as described above. The threshold determining module 308 is then, for a specific region among the plurality of regions, configured to determining a latest timestamp in the stored output of an object detection being associated with an object location within that region. The threshold determining module 308 may then use this time stamp to adjust the first threshold previously set such that the first threshold is adjusted to have a higher value if an earlier latest time stamp has been determined for the region, compared to if a later latest time stamp has been determined for the region. In some embodiments, the adjustment is only done for regions where few (below a threshold number) of detected object have been found among the plurality of images 302. In case no detected objects have been found among the plurality of images 302, the latest timestamp may be determined to have a minimum value such as 0 in the Unix time representation. In this case, the first threshold may be adjusted to have a maximum value, meaning that it requires a probable object detection of the first object type in this region for the object detection filtering module to let the object detection through. In case an object detection of the first object class has been just recently detected, the first threshold may be adjusted to be lower, since this fact may point to that objects classified as the first object type in the region may be more common recently. Similarly, in case an object detection of the first object class was detected in a region of the scene in an early image of the plurality of images 302 but not since then (in that region), the first threshold may be adjusted to be higher, since this fact may point to that objects classified as the first object type in the region may be rare.

Using both confidence scores as well as statistics relating to frequency of detections of objects of the first object types in a particular region of the scene when determining the first threshold may provide a flexible technique which accounts for many different situations and object behaviors. For example, setting the first threshold based on the confidence scores may be sufficient for regions where the object of the first object type is often detected, while in addition using the time period that has passed since the latest object of the first object type were detected may provide a more suitable and robust first threshold for regions where such objects rarely are detected.

The object detection filtering module 306 may use the first threshold set by the threshold determining module 308 (possibly after capping it as described above) for a region of the plurality of regions to filter out any object detections associated with a confidence score lower than the first threshold and with an object location in that region. In some embodiments, the first threshold is set for a plurality of regions for the first object type. In these cases, the object detection filtering module 306 may receive a first object detection classified as the first object type, the object detection being associated with a bounding box and a confidence score. The bounding box may overlap a plurality of regions, which means that the first threshold in all the overlapping regions may be considered when determining if the object detection should be removed or not. Put differently, the object detection filtering module 306 may be configured to determine the first threshold to be used for the first object detection based on the first threshold set for each region of the regions which the bounding box of the object detection overlaps. For example, the first threshold to be used may be determined by calculating an average value of the first thresholds set for each of the regions which the bounding box overlap. In other examples, the first threshold to be used may be determined by calculating a maximum value or a minimum value of the first thresholds set for each of the regions which the bounding box overlaps. In yet another example, a center point of the bounding box is used as location, which reduces complexity when determining the first threshold.

The concept of setting an adaptive confidence threshold for two object classes (object types, object classifications, etc.,) based on object behaviors and location in a scene will now be further elaborated in conjunction with FIG. 1.

FIG. 1 shows an example of determining representative confidence scores in a plurality of regions 106 of a scene for two different object classes 102, 104 detected in a scene 100. The scene 100 includes a one-way road on which cars 102 drive. A plurality of pedestrians 104 walk beside the road. The road has a pedestrian crossing, and the pedestrians 104 may cross the road at the crossing and continue walking on the other side of the road. The scene 100 further includes a plurality of fixed objects 108, in this example two houses, a tree and a playground. At the playground, a child 104 plays.

In FIG. 1, the scene 100 is divided into a plurality of regions 106, illustrated by dash-dotted lines, each having a same size in an image capturing the scene. As described above, this is just one out of many possible definitions of the concept "regions" in a scene.

In this example, all vehicles 102 in the scene counts as a first object class 102, and all people 104 counts as a second object class 104. Consequently, FIG. 1 comprises two "heat maps" 121, 122, each exemplifying a representative confidence score for each of the two object classes 102, 104, based on location in the scene. In FIG. 1, the heat maps have been divided into regions corresponding to the regions 106 of the scene 100. In the heat maps 121, 122, a darker grey colour represents a higher representative confidence score.

For the first object class (cars) 102, objects are only located on the road in the scene 100. Consequently, objects of the first object class 102 are only detected in these regions 110, 112 of the scene. For the rest of the regions 113, the representative confidence score is set as described above, for example to a predefined value or as "not applicable" or "not defined". The cars 102 typically move along the road (according to the speed limits of the road) and may be detected constantly on the road. This reflects the representative confidence score which has substantially the same value for each region of the scene corresponding to the road. However, just before the pedestrian crossing, cars may stop to let people cross the street. Consequently, the confidence of object detections of cars in these regions 112 may be higher due to the lower speed of the cars in this area. This behaviour is reflected by the representative confidence score in the regions 112 which may be higher compared to the representative confidence score for the rest of the road 110. As described above, the threshold used by the object detection filtering module (see FIG. 3) may thus vary based on where in the scene a car is detected, such that threshold is set to have a lower value if a higher representative confidence score has been determined for a region compared to if a lower representative confidence score has been determined for a region. Consequently, the threshold is lower in the regions in front of the pedestrian crossing compared to other parts of the road, which may lower the false negatives in these regions and increase safety for example in case the object detection system is used for controlling traffic flow or alarming a pedestrian that cars are approaching the pedestrian crossing.

For people 104, their behavior results in similar differences in representative confidence scores throughout the scene 100 which can be seen in heat map 122. People move along the sidewalk on one side of the road. This reflects the representative confidence score which has substantially the same value for each region 114 of the scene corresponding to the sidewalk. At the pedestrian crossing, they may stop to check traffic before crossing the road and continuing on the other side of the road. Consequently, the confidence of object detections of people in these regions 116 may be higher due to that they wait before crossing the road. This behaviour is reflected by the representative confidence score in these regions 116 which may be higher compared to the representative confidence score for the rest of sidewalk 114. Consequently, the first threshold is lower in the regions in front of the pedestrian crossing compared to other parts of the road, which may lower the false negatives in these regions and increase safety in case the object detection system is used for controlling traffic flow or alarming a car that people are approaching the pedestrian crossing.

The playground is further away from the camera capturing the scene, which may result in more uncertain classifications of people in the regions 120 corresponding to the playground, which in turn results in a lower representative confidence score. For the rest of the regions 113 in the scene, people are generally not present which means that the representative confidence score is set as described above, for example to a predefined value or as "not applicable" or "not defined". This may result in a higher first threshold for these areas, reducing the number of false positives in these areas. For example, it may be important that an object detection system is certain (with a high probability resulting in a high confidence score) that a person is walking on the road (away from the pedestrian crossing) before alarming e.g., law enforcement.

FIG. 2 shows another example of a scene 100. Different from the "heat maps" 121, 122 of FIG. 1, FIG. 2 shows a "cold map" 200 which defines how long ago an object of a first object type (a car in this example) was latest detected in an area of the scene. A darker grey represents a more recent occurrence of a car in the corresponding region of the scene, while a lighter grey represent that a longer period of time has passed since a car occurred in the corresponding area of the scene. In FIG. 2, the regions of the scene are not shown to better visualize the embodiment.

FIG. 2 comprises a first road near the camera capturing images of the scene and a second road far away in the distance. The first road is a highway, on which cars abundantly drive. Consequently, the regions 204 representing the highway have a dark color in the cold map 200. The second road represents a dirt road in the distance on which cars more seldom drive. Consequently, the regions 206 representing the dirt road have a lighter color in the cold map 200. For the remaining areas 202 of the scene, cars have not been detected in the plurality of images from which statistics have been determined. In this case, the corresponding timestamp is set to minimum value (thus, a very long time period since a car was detected in these areas) which results in a white color in the cold map 200.

FIG. 4 shows a flow chart of a setting a threshold in an object detection system according to embodiments. The method 400 comprises running S402 an object detector module (as described above) on a plurality of images depicting a scene and storing S404 outputs from the object detector module.

The method 400 further comprises, for each region of a plurality of regions in the scene: based on the stored outputs, determining S406 a representative confidence score of object detections being associated with an object location within said region.

The method 400 further comprises, for at least a first region of the plurality of regions in the scene setting S408 the first threshold for object detections associated with an object location within the first region based on the representative confidence score determined for the first region, wherein the first threshold is set to have a lower value if a higher representative confidence score has been determined for the first region compared to if a lower representative confidence score has been determined for the first region.

In some embodiments, wherein the object detector module is configured to associate each of the one or more object detections with a respective timestamp as described above, the method 400 further comprises, for each region of the plurality of regions in the scene: based on the stored output, determining S410 a latest timestamp in the stored output of an object detection classified as the first object class and being associated with an object location within said region. Furthermore, the method 400 comprises, adjusting S412 the first threshold set in step S408 for object detections associated with an object location within the first region of the plurality of regions based on the latest timestamp determined for the first region, wherein the first threshold is adjusted to have a higher value if an earlier latest time stamp has been determined for the first region, compared to if a later latest time stamp has been determined for the first region.

In some embodiments, the object detector module is continuously receiving images, such that steps S402-S408, or S402-S412 can be performed at a plurality of points in time, wherein for each point in time, the object detector module is run on the latest received N>1 images. In this way, the first threshold may be continuously updated and may conform to changing behaviors of objects in the scene, or any other relevant changing conditions. The N>1 images may overlap between different runs such that some of the images being part of data used when setting thresholds at a first point in time may also be part of data used when setting thresholds at a second point in time. In other embodiments, the pluralities of images used at different points in time are mutually exclusive. In embodiments, the thresholds are set continuously over 24 hours such as once per hour, once per 12 hours or with any other suitable interval. In other embodiments, the thresholds are set continuously over a year, such as once per week, or once per month. Any other suitable interval between setting the thresholds may apply.

The above embodiments are to be understood as illustrative examples of the disclosure. Further embodiments of the disclosure are envisaged. For example, the techniques involving the cold map described in conjunction with FIG. 2 and throughout the disclosure may be used separately to set thresholds used in an object detection system. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method for setting a threshold in an object detection system, the method comprising:
   a) detecting objects in a plurality of images depicting a scene and storing outputs, wherein the stored outputs comprise one or more object detections of objects classified as a first object class, each object detection being associated with an object location and a confidence score representing a confidence that the object detection is of the first object class;
   b) for each region of a plurality of regions in the scene:
      based on the stored outputs, determining a representative confidence score of object detections classified as the first object class and being associated with an object location within said region, wherein the representative confidence score is an average, or a weighted average, of the confidence scores of a plurality of object detections being associated with an object location within said region in the stored output;
   c) operating on the stored outputs to remove any object detection of the one or more object detections being associated with a confidence score below a first threshold, wherein the method further comprises:
   d) setting the first threshold for object detections associated with an object location within a first region of the plurality of regions based on the representative confidence score determined for the first region, wherein the first threshold is set to have a lower value if a higher representative confidence score has been determined for the first region compared to if a lower representative confidence score has been determined for the first region,
   wherein
   setting the first threshold comprises determining a difference between the representative confidence score and a predefined threshold confidence score, wherein upon the difference being above 0, the first threshold is set to a value lower than the predefined threshold confidence score, wherein upon the difference being below 0, the first threshold is set to a value higher than the predefined threshold confidence score, wherein the predefined threshold confidence score is a baseline confidence score.

2. The method according to claim 1, wherein determining a representative confidence score comprises disregarding any object detections associated with a confidence score below a second threshold when determining the representative confidence score.

3. The method according to claim 1, wherein a deviation between the first threshold and the predefined threshold confidence score increases with increasing size of the difference.

4. The method according to claim 3, wherein the value of the first threshold is capped at a minimum value and a maximum value.

5. The method according to claim 1, wherein, for each region of the plurality of regions, the representative confidence score is an average confidence score of object detections being associated with an object location within said region.

6. The method according to claim 1, wherein step a) further comprises associating each of the one or more object detections with a respective timestamp, wherein, for each region of the plurality of regions, the representative confidence score is a weighted average confidence score of object detections being associated with an object location within said region, wherein a weight is based on one or more of: a value of the confidence score, and the associated timestamp.

7. The method according to claim 1, wherein step a) further comprises associating each of the one or more object detections with a respective timestamp, wherein the method further comprises:

e) for each region of the plurality of regions in the scene: determining a latest timestamp for the region, by determining a latest timestamp in the stored output of an object detection being associated with an object location within said region; and f) adjusting the first threshold set in step d) for object detections associated with an object location within the first region of the plurality of regions based on the latest timestamp determined for the first region, wherein the first threshold is adjusted to have a higher value if an earlier latest time stamp has been determined for the first region, compared to if a later latest time stamp has been determined for the first region.

8. The method according to claim 1, further comprising the step of:

continuously receiving images;

wherein the steps a)-d) are performed at a plurality of points in time, wherein for each point in time, step a) of detecting objects is performed on the latest received $N>1$ images.

9. The method of claim 7, further comprising the step of: continuously receiving images;

wherein the steps a)-f) are performed at a plurality of points in time, wherein for each point in time, step a) of detecting objects is performed on the latest received $N>1$ images.

10. The method of claim 1, wherein step d) is performed for $M>1$ regions of the plurality of regions in the scene, the method further comprising the step of:

receiving, a first object detection classified as the first object type, the object detection defined by a bounding box and being associated with and a confidence score, wherein said bounding box overlaps the M regions, determining the first threshold to be used for said first object detection based on the first threshold set for each region of the M regions.

11. The method of claim 10, wherein the step of determining the first threshold to be used for said first object detection comprises one of:

calculating an average value of the first thresholds set for each of the M regions and using the average value as the first threshold for the first object detection;

calculating a maximum value of the first thresholds set for each of the M regions and using the maximum value as the first threshold for the first object detection;

calculating a minimum value of the first thresholds set for each of the M regions and using the minimum value as the first threshold for the first object detection.

12. An object detection system comprising:

circuitry configured for:

a) detecting objects in a plurality of images depicting a scene and storing outputs, wherein the stored outputs comprise one or more object detections of objects classified as a first object class, each object detection being associated with an object location and a confidence score representing a confidence that the object detection is of the first object class;

b) for each region of a plurality of regions in the scene:

based on the stored outputs, determining a representative confidence score of object detections classified as the first object class and being associated with an object location within said region, wherein the representative confidence score is an average, or a weighted average, of the confidence scores of a plurality of object detections being associated with an object location within said region in the stored output;

c) operating on the stored outputs to remove any object detection of the one or more object detections being associated with a confidence score below a first threshold, wherein the method further comprises:

d) setting the first threshold for object detections associated with an object location within a first region of the plurality of regions based on the representative confidence score determined for the first region, wherein the first threshold is set to have a lower value if a higher representative confidence score has been determined for the first region compared to if a lower representative confidence score has been determined for the first region, wherein setting the first threshold comprises determining a difference between the representative confidence score and a predefined threshold confidence score, wherein upon the difference being above 0, the first threshold is set to a value lower than the predefined threshold confidence score, wherein upon the difference being below 0, the first threshold is set to a value higher than the predefined threshold confidence score, wherein the predefined threshold confidence score is a baseline confidence score.

13. The object detection system of claim 12, being implemented in a monitoring camera.

14. A non-transitory computer-readable storage medium having stored thereon instructions for implementing a method, when executed on a device having processing capabilities, the method for setting a threshold in an object detection system, the method comprising:

a) detecting objects in a plurality of images depicting a scene and storing outputs, wherein the stored outputs comprise one or more object detections of objects classified as a first object class, each object detection being associated with an object location and a confidence score representing a confidence that the object detection is of the first object class;

b) for each region of a plurality of regions in the scene:

based on the stored outputs, determining a representative confidence score of object detections classified as the first object class and being associated with an object location within said region, wherein the representative confidence score is an average, or a weighted average, of the confidence scores of a plurality of object detections being associated with an object location within said region in the stored output;

c) operating on the stored outputs to remove any object detection of the one or more object detections being associated with a confidence score below a first threshold, wherein the method further comprises:

d) setting the first threshold for object detections associated with an object location within a first region of the plurality of regions based on the representative confidence score determined for the first region, wherein the first threshold is set to have a lower value if a higher representative confidence score has been determined for the first region compared to if a lower representative confidence score has been determined for the first region, wherein setting the first threshold comprises determining a difference between the representative confidence score and a predefined threshold confidence score, wherein upon the difference being above 0, the first threshold is set to a value lower than the predefined threshold confidence score, wherein upon the difference being below 0, the first threshold is set to a value higher than the predefined threshold confidence score, wherein the predefined threshold confidence score is a baseline confidence score.

* * * * *